Oct. 5, 1965  H. A. JEWETT  3,209,638
KEYBOARDS AND ACTIONS
Filed Aug. 26, 1964  9 Sheets-Sheet 1
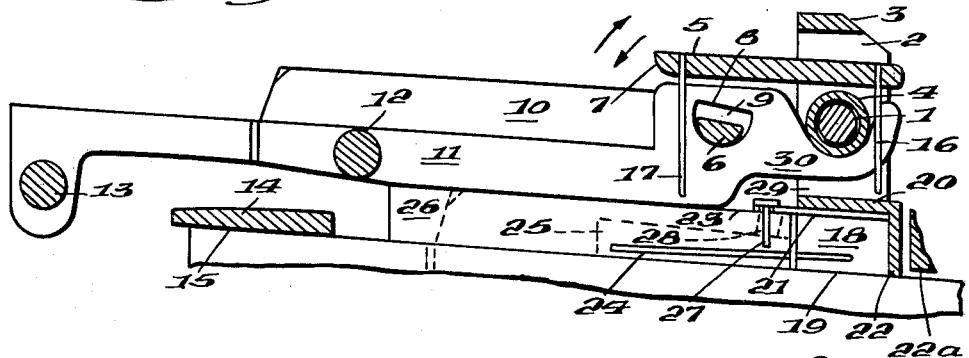
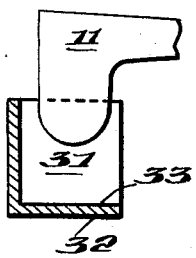
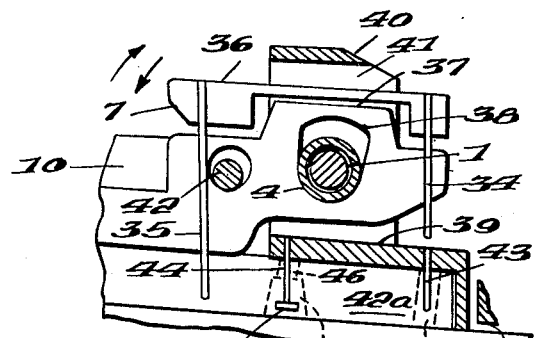
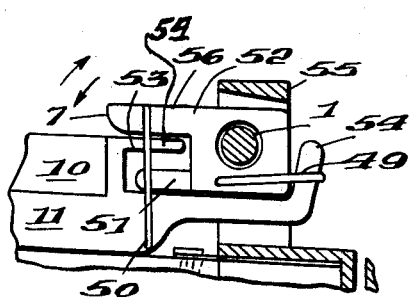
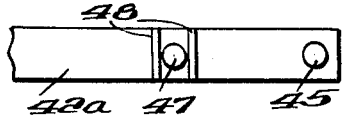
INVENTOR.
Harold A. Jewett.

Oct. 5, 1965  H. A. JEWETT  3,209,638
KEYBOARDS AND ACTIONS
Filed Aug. 26, 1964  9 Sheets-Sheet 2
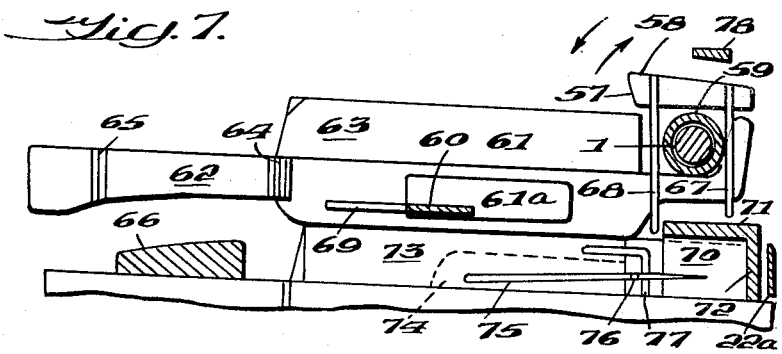
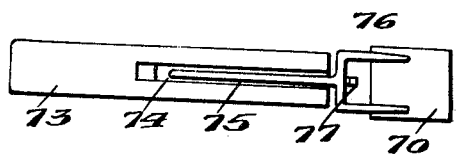
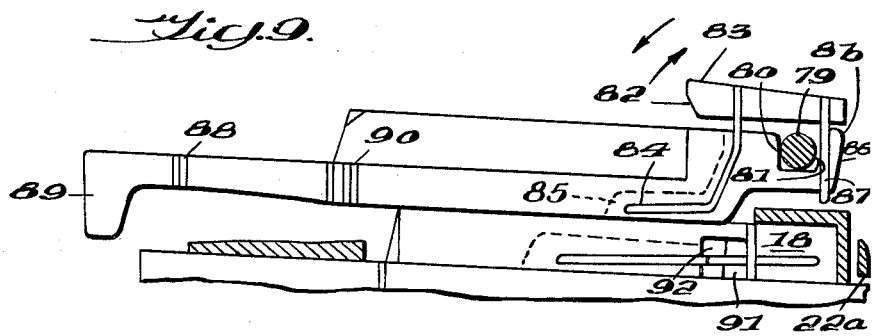
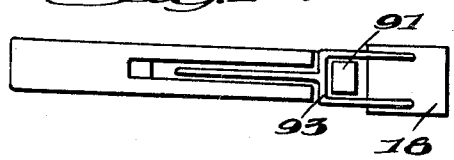
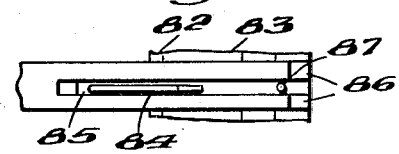
INVENTOR.
Harold A. Jewett.

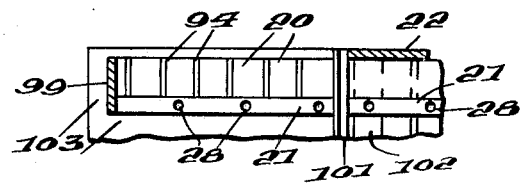
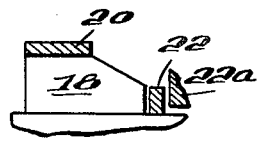
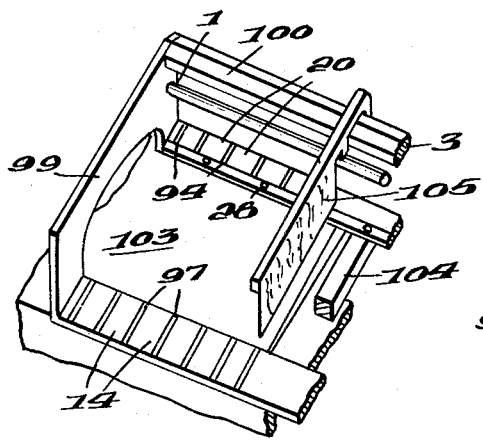
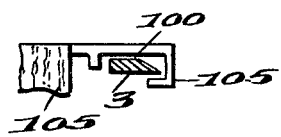
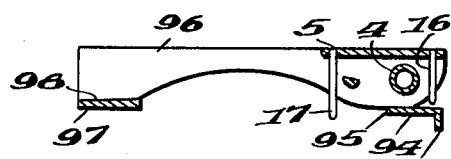
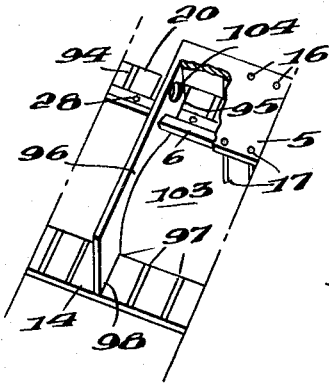
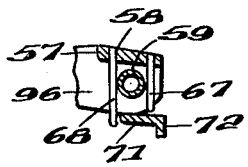
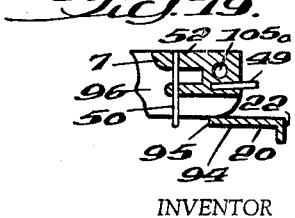
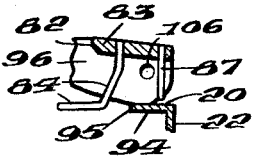
INVENTOR
Harold A. Jewett Oct. 5, 1965    H. A. JEWETT    3,209,638
KEYBOARDS AND ACTIONS
Filed Aug. 26, 1964    9 Sheets-Sheet 4
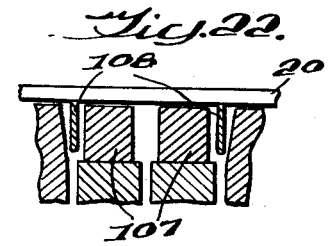
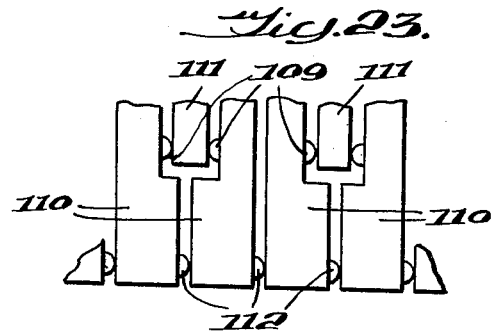
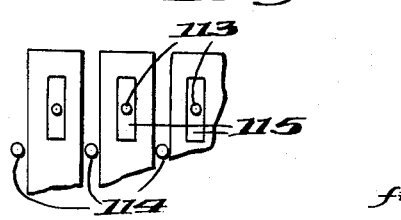
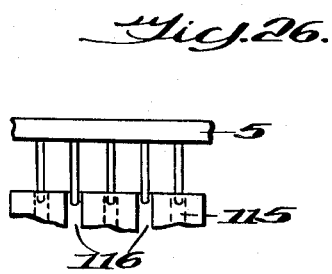
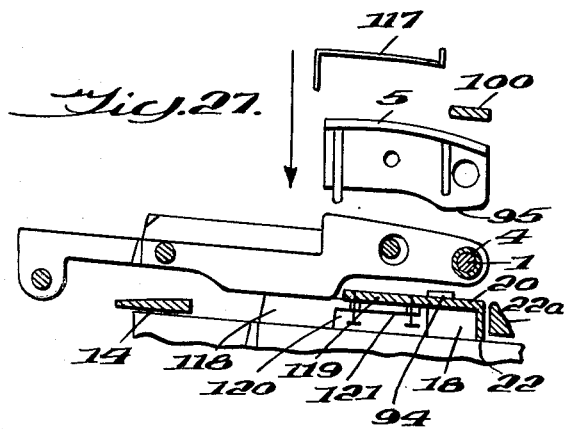
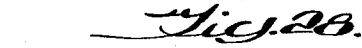
INVENTOR
Harold A. Jewett Oct. 5, 1965    H. A. JEWETT    3,209,638
KEYBOARDS AND ACTIONS
Filed Aug. 26, 1964    9 Sheets-Sheet 5
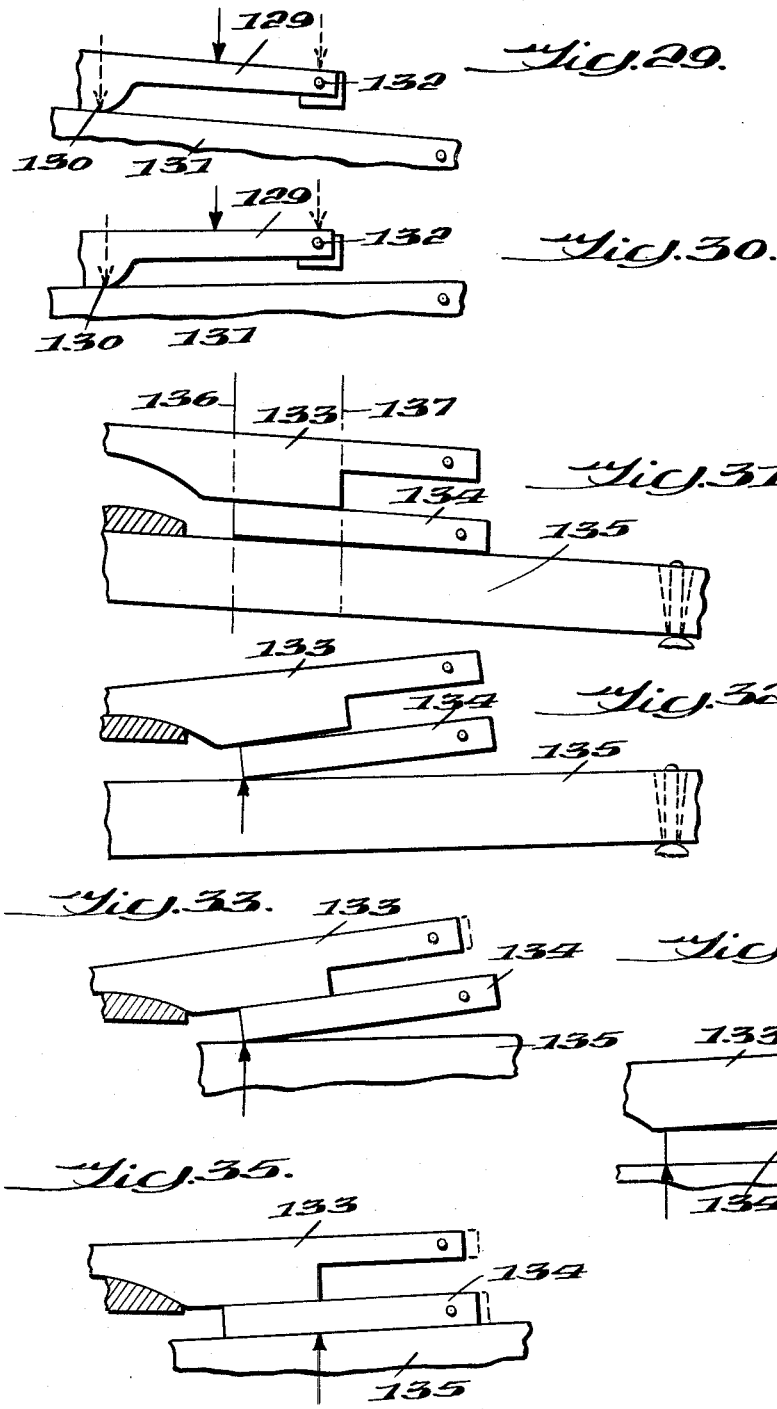
INVENTOR
Harold A. Jewett.

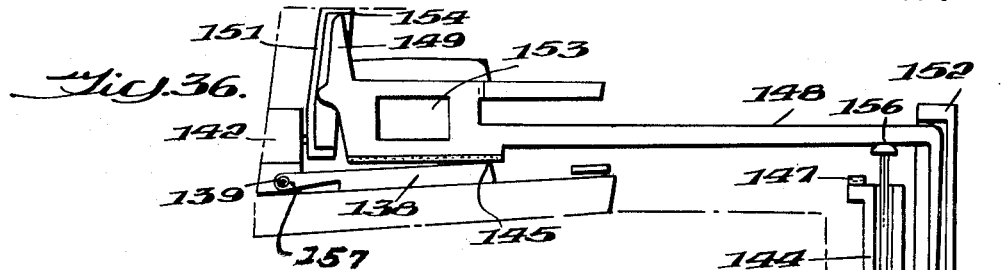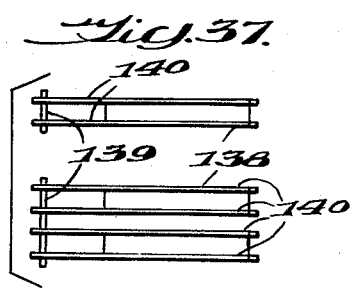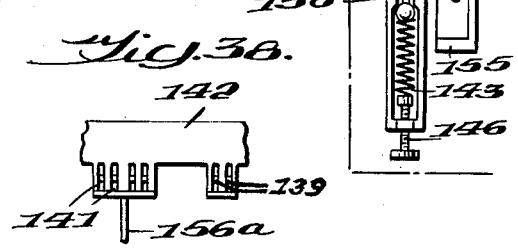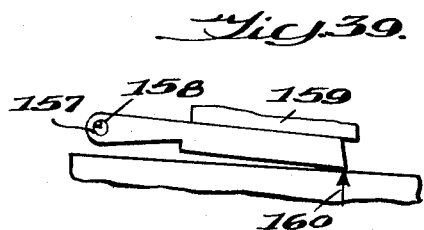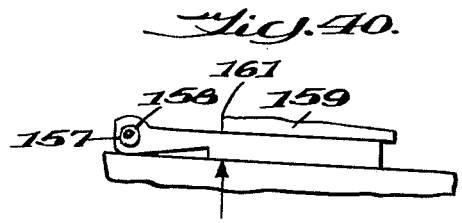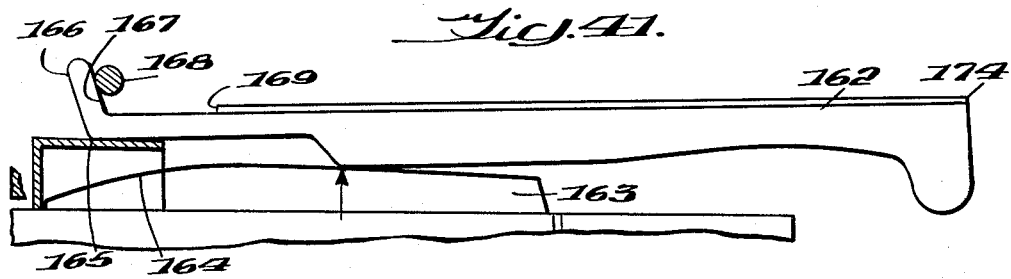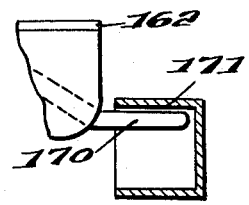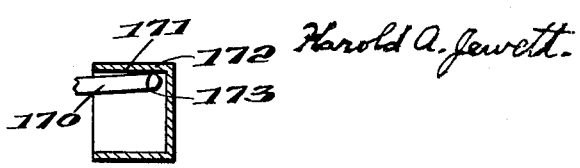

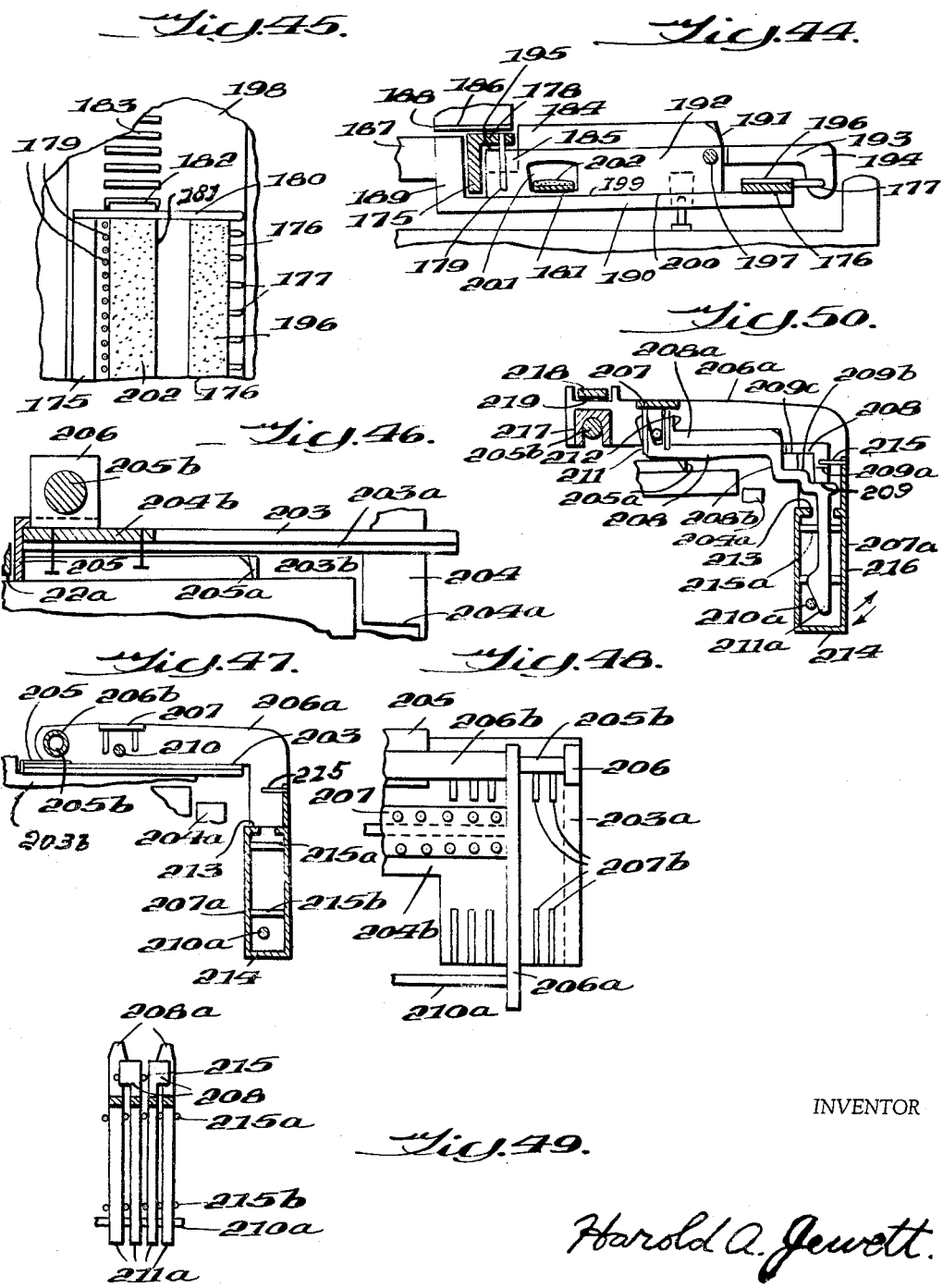

Oct. 5, 1965
H. A. JEWETT
3,209,638
KEYBOARDS AND ACTIONS
Filed Aug. 26, 1964
9 Sheets-Sheet 9
FIG. 55.
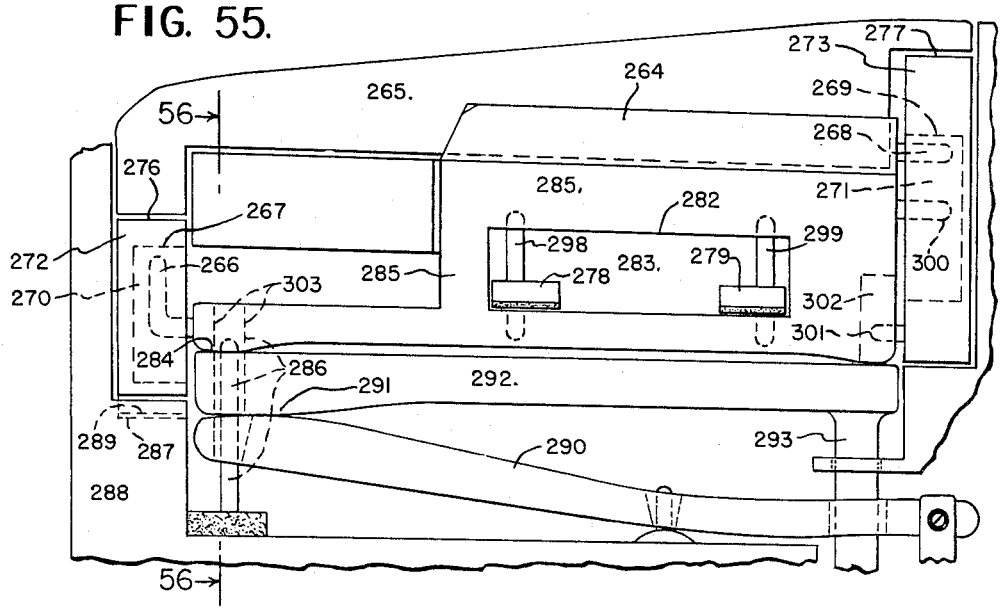
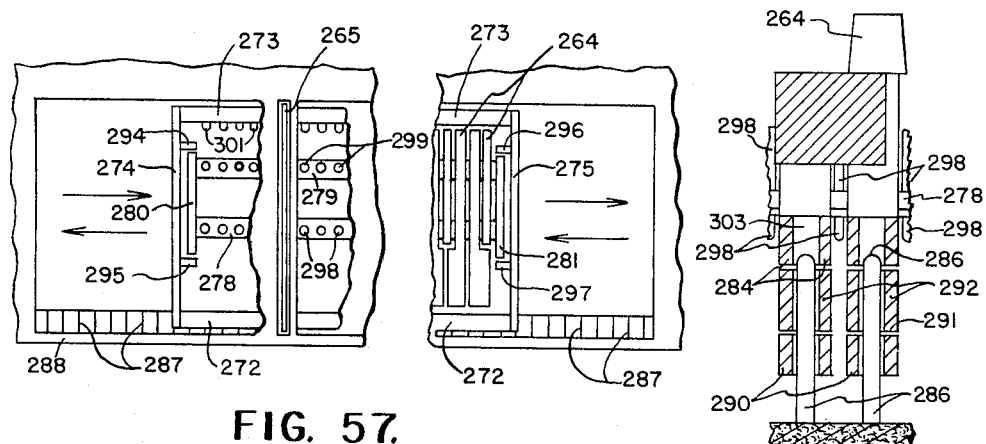
FIG. 57.
FIG. 56.
INVENTOR
Harold A. Jewett.

United States Patent Office 3,209,638
Patented Oct. 5, 1965

3,209,638
KEYBOARDS AND ACTIONS
Harold A. Jewett, 5451 42nd St. NW., Washington, D.C.
Filed Aug. 26, 1964, Ser. No. 392,187
53 Claims. (Cl. 84—446)

This application contains subject matter which was disclosed to some extent in applicant's applications S.N. 138,424, filed Jan. 13, 1950; S.N. 307,099, filed Aug. 29, 1952; S.N. 116,364, filed June 5, 1961; S.N. 238,339, filed Nov. 19, 1962, and the applications on which his U.S. Patents 2,675,728 and 2,675,729 (now Reissue No. 23,956) and 2,996,942 issued; said S.N. 138,424 and 307,099, though now abandoned, having co-pended with the applications on which his said patents issued.

Said parent patents may be referred to below as '728; '956 and '942; and said parent applications as '424, '099, '364, and '339. All of said patents as issued and said applications as amended are hereby incorporated-by-reference herein, insofar as not inconsistent with the disclosure of this application.

A number of abbreviations and terms used herein and/or the aforesaid parent applications will have the following meanings:

| | |
|---|---|
| tr | transposing device or keyboard. |
| $\frac{oct}{7}$ | 1/7 octave length. |
| $\frac{oct}{12}$ | 1/12 octave length and/or a semitone, depending on the context. |
| ivory or ivory cap or top. | the upwardly facing finger-contacting surface of a key, whether or not supplied by a lamina. |
| equalizer | means for imparting an approximately rectilinear quality, such as is commonly termed "straightline motion" or "parallel motion," to the down movement of the ivory of a piano or organ type key during use. |
| carrier key | any one of a succession of keys whose upper portions are generally alike and which are, or are provided with, their own equalizer means, and are adapted to carry and impart their equalization to ivory-capped passenger keys or passenger levelizers riding on them. |
| passenger key | any one of a succession of keys which are generally alike (except that some are capped with white ivories and others with black) and are adapted to ride on carrier keys as aforesaid. |
| passenger levelizer. | a levelizer which is adapted to ride on carrier keys as aforesaid, at least during a part of the descent of the levelizer during use. |

This application has as objects, in regard to portable tr assemblies, the provision of novel means, or novel combination of means:

(a) For installation merely by setting the assembly down on or over a host manual, and de-installation merely by lifting the assembly away from such manual;

(b) For centering and securing against endward displacement;

(c) For stabilizing against frontward or upward displacement without resort to fastening structures;

(d) For shifting a manual of tr keys to a desired transpositional position by a single, approximately instantaneous manipulation;

(e) For minimizing the distance of the tr manual above the host manual;

(f) For minimizing arcing of the tr keys and levelizers associated with them, as well as the drop of the tr white key fronts;

(g) For minimizing rub and wear of key action and guide parts.

This application has as further objects, and in regard to in-built tr's (besides above objects a–g insofar as applicable):

(h) For minimizing outwardly visible differences from non-tr keyboard instruments;

(i) For minimizing front-to-rear overall dimension;

(j) For imparting improved ivory motion to the tr keys.

Accomplishment of said objects is effected by the novel means disclosed in '942, '364 and '339, and/or the novel improvements in respect thereto exemplified in the figures hereof.

Further objects include tr manuals in which the drop of the rears of the ivories of the tr keys during use will be at least 1/5, better 1/4, 1/3, 1/2, 2/3, or even equal to, the drop of said ivories at their fronts during use; also, novel forms of tr keys and levelizers, novel spacers and guides for them, novel tr frames and frame parts, novel tr keyslifter bars and associated parts, and novel lifter keys. Accomplishment of said further objects likewise is effected by the novel means disclosed in '942, '364 and '339, and/or the aforesaid novel improvements in respect thereto exemplified in said figures.

An additional object is the provision of novel tr assemblies comprising tr keys and rearwardly pivoted, approximately horizontally disposed elongate levelizers, the rearwardmost portions of which keys and levelizers are permitted downward play during use, at least during part of the descent of said keys and levelizers, but advantageously throughout it; this object being accomplished by providing for at least about 1/64", better 1/48", 1/32", 1/16", 3/32", 1/8", or even more, vertical leeway for downward movement of said rearwardmost portions during use; said leeway serving to alleviate, or entirely obviate, the hereinafter discussed division-of-finger-force problem, and said downward movement advantageously being limited by tr frame down-stop structure; such down stop structure also being advantageously present in the case of the keys of the auxiliary manuals of the following paragraph.

A still further object is the provision of auxiliary manuals comprising low-lying, elongate, rearwardly pivoted, levelizers, and preferably (but not necessarily) being tr manuals, for use in operative association with a host instrument, especially a piano, wherein the location of the rears of the white ivories of said manuals is at least 2", better 2 1/4", 2 1/2", 2 5/8", 2 3/4", 2 7/8", 3" or even more, frontward of the locus of the rears of the white ivories of the host keys during use; whereby supplemental mechanical advantage is imparted to the leverage action of said host keys, thereby alleviating the relative heaviness of touch of their rearward portions, especially in the case of host piano white keys, and thereby improving on the playing feel of said host keys.

Owing to the fact that existent manufacturing designs of keyboard type musical instruments as a rule comprise a variety of structural arrangements immediately (or not far) rearwardly of their stop rails, minimization of occasion for revision of such designs is a further object of the invention. On this score, it may be stated generally that in the case of in-built embodiments, the rearwardmost shiftable longitudinal member of the frames in the devices or assemblies of the invention should extend not more than about 1/4, 1/5, 1/7, 1/9 or 1/10 (if at all) the tr keys' white-ivory length rearwardly of the vertical plane which includes the rears of the white ivories of said tr keys.

Additional objects and their accomplishment will appear as the description of the invention proceeds.

All the figures in this application were drawn to full scale, except where otherwise specified or apparent. In them, chromatic scale tone producer installations, if not shown, are to be understood as implied; moving and bearing parts as optionally provided with "anti-stick" or slippery-but-wear-resistant surfacing at bearing or rub points; lever, spring or other moving parts as provided, when needed, with suitable freedom of play and appropriate stop, anti-backlash, damper and/or sound-absorbing means; all drawings as basically diagrammatic or schematic; and all expressions such as vertical, horizontal, downward, upward, front, rear, lateral, parallel, longitudinal, etc., as relative and approximate unless otherwise evident.

In said figures (to be more particularly described later on):

FIG. 1 is an end elevation, partly in section and with shiftable frame ends omitted, of the treble-end portion of a portable *tr* assembly of the invention in position of use on a host manual;

FIG. 2 is a bottom view of the levelizer-guides-partition unit appearing in FIG. 1;

FIG. 3 is an elevation detail of the front portion of a white *tr* key such as appearing in FIG. 1 but provided with an alternative form of spacer structure;

FIG. 4 is similar to the rear portion of FIG. 1 except for certain below-discussed variations;

FIG. 5 is a bottom view of the levelizer-guides-partition unit appearing in FIG. 4;

FIG. 6 is similar to the rear portion of FIG. 1 except for certain further variations;

FIG. 7 is similar to FIG. 1 except in certain below-discussed respects;

FIG. 8 is a bottom view of the levelizer-guides-partition unit appearing in FIG. 7;

FIG. 9 is similar to FIG. 7 except for certain variations;

FIG. 10 is a bottom view of the levelizer-guides-partition unit appearing in FIG. 9;

FIG. 11 is a bottom view of the rear portion of one of the *tr* keys and associated structure appearing in FIG. 9;

FIG. 12 is a plan detail, in reduced scale, of the bass end of the stationary frame partially appearing in FIG. 1, but with the anchor strip of FIG. 1 cut away; similar cutting away being contemplated for the treble end;

FIG. 13 is a treble-end elevation detail showing elimination of part of the rear portion of the floor, and an upper portion of the anchor strip, appearing in FIG. 1;

FIG. 14 is a reduced scale perspective detail of the bass end of the stationary frame partially appearing in FIG. 1, together with a removable flag or curtain disposed to indicate the bass end of the active span of the *tr* assembly during use, a similar flag or curtain at the treble end being contemplated;

FIG. 15 is an elevation detail of the rear portion of such flag or curtain and its support;

FIG. 16 is similar to FIG. 14 except for omission of certain frame parts and addition of the bass-end portion (partially cut away) of the shiftable frame of FIG. 1;

FIG. 17 is a treble-end elevation of the bass end arm and parts associated therewith appearing in FIG. 16;

FIG. 18 is a reduced scale treble-end, elevation detail of the rear portion of a bass-end arm and associated parts for use in the FIG. 4 embodiment of the invention;

FIG. 19 is the same as FIG. 18 except modified for use in the FIG. 6 embodiment of the invention;

FIG. 20 is the same as FIG. 18 except modified for use in the FIG. 7 embodiment of the invention;

FIG. 21 is the same as FIG. 18 except modified for use in the FIG. 9 embodiment of the invention;

FIG. 22 is a schematic front elevation sectional detail showing thin centering partitions of the invention flanking a centrally located pair of levelizers;

FIG. 23 is a reduced scale plan view of frontward portions of a series of white *tr* keys of the invention carrying spacer beads in novel arrangement on their side walls;

Figure 51:
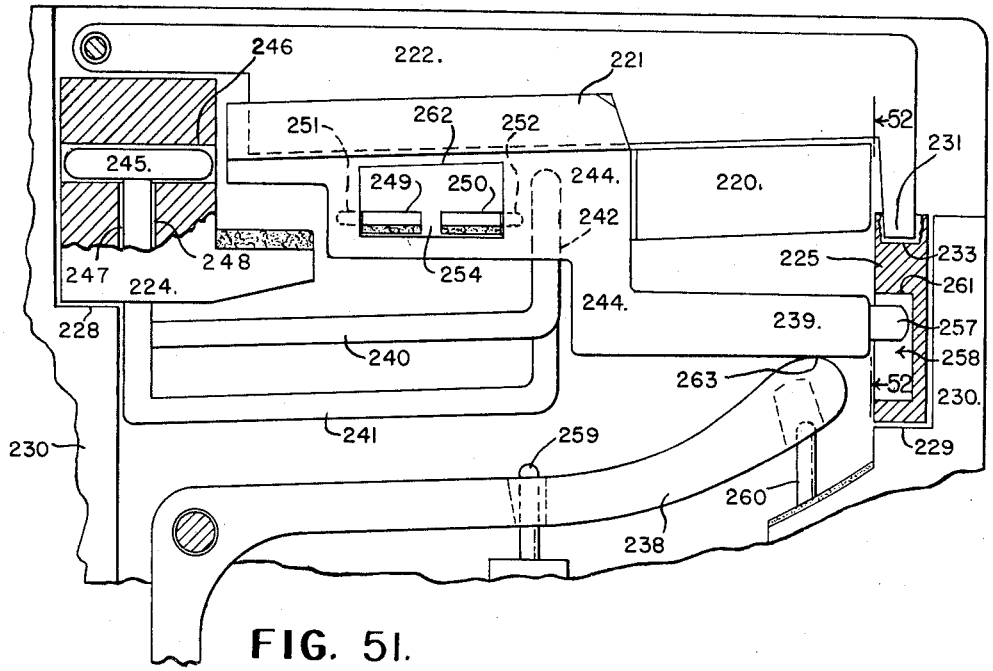
Figure 53:
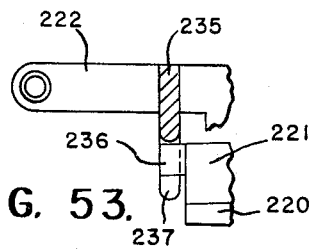
Figure 52:
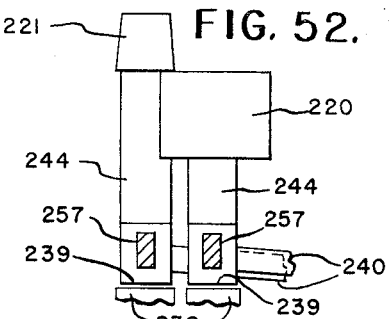
Figure 54:
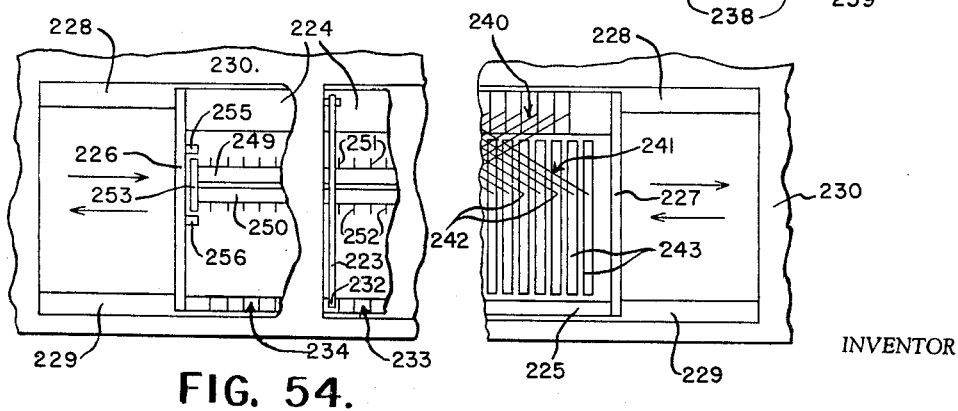

FIG. 24 is a reduced scale diagrammatic sectional detail of a 19-key series of host black caps and levelizers with a 13-key series of *tr* keys overlying them; the latter being in position corresponding to four semitones of transposition downward, and the octave length in each of said series, as well as the usual differences in intra-octave center-to-centering of piano-type keys, likewise being the same in each series;

FIG. 25 is a plan view of rearward portions of a series of *tr* keys of the invention with guide sleeves, inverted guide pins in them, and alternative between-keys inverted guide pins;

FIG. 26 is a diagrammatic plan detail showing the pins of FIG. 25 depending from shiftable frame structure and in process of being fed downwardly into the positions depicted in FIG. 25;

FIG. 27 is a reduced scale exploded treble-end elevation of an assembly broadly analogous to that of FIG. 1 but with certain variations and additions;

FIG. 28 is a reduced scale treble-end elevation of an assembly similar to that of FIG. 27 but with certain parts omitted, and with certain variations;

FIG. 29 is a treble-end elevation diagram of rear portions of a *tr* key and a levelizer beneath it (both in the up position), to be discussed below in reference to the division-of-finger-force problem solved by the invention;

FIG. 30 is the same as FIG. 29 except that the *tr* key and levelizer are in the down position;

FIG. 31 is a reduced scale treble-end elevation diagram of a host key supporting a rearwardly pivoted levelizer, and the latter in turn supporting a rearwardly pivoted *tr* key; said lever, levelizer and *tr* key all being in the up position;

FIG. 32 is the same as FIG. 31 except that the host key, levelizer and *tr* key are all in the down position, the frontward portion of the *tr* key having come to rest on the front down stop rail appearing in FIG. 31;

FIG. 33 is the same as FIG. 32 except that the *tr* key has been converted to a passenger key in relation to the levelizer, the latter serving in the manner of a carrier key therefor;

FIG. 34 is the same as FIG. 32 except that the levelizer has been converted to a passenger levelizer in relation to the host white key, the latter serving as a carrier key therefor;

FIG. 35 is the same as FIG. 32 except that it combines the passenger *tr* key of FIG. 33 with the passenger levelizer of FIG. 34, so that they and the host white ivory supporting them are all in mutually parallel intercontact as shown;

FIG. 36 is a ½ scale copy (except for omission of certain presently extraneous portions) of FIG. 49 of '099;

FIG. 37 is a reduced scale copy of FIG. 50 of '099;

FIG. 38 is a further reduced scale copy of FIG. 51 of '099;

FIG. 39 is an elevation detail (in less reduced scale) of the *tr* key, levelizer, and host white key of FIG. 36, all in the down position;

FIG. 40 is the same as FIG. 39 except that the fulcrum and the levelizers have been varied so as to insure that the rear end of the levelizer will rescend fully during use, i.e., so that the levelizer will be a passenger levelizer in relation to the host white key beneath it, not only in the initial part of its descent, but also in the final part;

FIG. 41 is a side elevation of a *tr* white key of the invention in partially depressed position, as a result of finger force applied adjacent the rear of its ivory; downward movement of the rear of the key itself having been stopped by impingement on the floor underlying it;

FIG. 42 is a side elevation detail of the front portion of the white *tr* key of FIG. 41, showing incorporation of a spacer pin into the key, plus association of frame parts therewith;

FIG. 43 is the same as FIG. 42 but with the key portion omitted and the front of the pin sloping rearwardly, thus depicting the up-stop functioning of the frame structure overlying the pin;

FIG. 44 is a ½ scale end elevation, partly in section and with certain parts omitted, of a *tr* assembly of the invention built into a pre-existent host instrument;

FIG. 45 is a ¼ scale plan detail of host treble-end block sleeve structure, together with treble-end shiftable frame parts, of the FIG. 44 embodiment;

FIG. 46 is a ½ scale end elevation, partly in section and with certain parts omitted, of a host instrument and associated *tr* frame parts, plus levelizers, of an embodiment corresponding generally to that of FIG. 18 of '339, but embodying certain variations and improvements;

FIG. 47 is a ¼ scale end elevation, partly in section and with certain parts omitted, of the host instrument in FIG. 46 with a shiftable *tr* frame associated therewith in position of use;

FIG. 48 is a ¼ scale plan, with certain parts omitted, of the treble-end portion of the shiftable *tr* frame of FIG. 47, supported by non-shiftable frame treble-end structure which is in turn supported by the host end block;

FIG. 49 is a ¼ scale front elevation detail of a succession of four of the *tr* keys, plus associated guide and stop structures, of a *tr* manual for use in the assemblies of FIGS. 46–48;

FIG. 50 is a ¼ scale end elevation, partly in section and with certain parts omitted, of a manual comprising *tr* keys such as those of FIG. 49 in position of use; the frame parts appearing in the drawing being the same as shown in one or more of FIGS. 46–49 but with the rear portion of the *tr* shiftable frame of FIG. 47 altered to facilitate installation of the overall assembly into position of use, as well as to stabilize it in such position;

FIG. 51 is an end elevation, partly in section and with bass end parts omitted, of an in-built embodiment of the invention wherein the *tr* keys are carried by crank-type equalizers;

FIG. 52 is a front elevational detail, partly in section, of a pair of the *tr* keys of FIG. 51;

FIG. 53 is an end elevational detail, partly in section, of a variation of the rear portion of the manual of FIG. 51 and adjacent parts;

FIG. 54 is a plan diagram of the *tr* of FIG. 51, with certain parts omitted;

FIG. 55 is an end elevation, with certain end parts omitted, of an in-built embodiment of the invention wherein the *tr* keys are carried by cane-type equalizers;

FIG. 56 is a section on line 56—56 of FIG. 55;

FIG. 57 is a plan diagram of the *tr* of FIG. 55, with certain parts omitted.

The aforesaid FIGS. 51–57 are from both parent Ser. No. 585,010 (on which '942 issued) and parent Ser. No. 116,364.

Referring to the drawings in detail:

In FIGS. 1–2 anchor rod 1 is fixed in bass-end member 2 of non-shiftable frame 3, as well as in a corresponding member (understood) at the opposite end of frame 3. Slidably sleeved on rod 1 is pivot tube 4 which is integrated to end arms (understood) that in turn are united by roof 5 to form a shiftable frame. Rod 6 also is rigidly united at its ends to said end arms, so that when roof 5 is raised, as e.g. by finger pressure exerted upwardly at its front 7, rod 6 is lifted into engagement with ceilings 8 of apertures 9, tube 4 being simultaneously rotated clockwise and *tr* black keys 10 and white keys 11 consequently being lifted; whereupon transpositional shifting may be effected in manner discussed in connection with FIGS. 14, 16, and 17 below. Spacer beads such as 12 and 13, integral wiht side walls of the *tr* white keys, will be discussed below in connection with FIGS. 23–24. Front down-stop rail 14 is a longitudinal member of the non-shiftable sub-assembly, and while shown as if supported by the fronts of host white ivories 15, it optionally may be supported by host end blocks (understood) or otherwise. Rear guide pins 16 and more frontward guide pins 17 rigidly depend from roof 5. They are shown in solid lines (adjacent parts also being in solid lines, as if transparent) both for emphasis and to signify that they may optionally occupy either key-to-key spaces or axial guide sleeves (understood) in the keys. Partitions 18 are shown as resting on rearward portions 19 of host white ivories 15, but optionally they may merely overly said portions, e.g. if terminal portions of non-shiftable floor 20 be supported by host end blocks, since said partitions, lamina 21 and anchor strip 22 (immediately frontward of host stop rail 22a) are mutually integrated. Said anchor strip is disposed in juxtaposition to the rears of host black caps 23, thereby anchoring the non-shiftable sub-assembly during use. Guide pins 24, fixed in partitions 18, extend frontwardly into recesses 25 in levelizers 26 to preserve said levelizers in parallel co-alinement during use, and also to act as cagers for them during installation and de-installation of the overall assembly into position of use, by engaging the ceilings of said recesses; while removable anchor pins 27 depending from lamina 21 and loosely occupying holes 28 in the levelizers provide loose anchorage for the latter during use. It will be noted that each levelizer and associated parts can be installed or de-installed individually; also that if the shiftable sub-assembly as a whole be rotated clockwise and rod 6 extracted, each *tr* key can similarly be individually extracted or fed into place.

It is contemplated that stop rail 14, serving the *tr* black keys 10 as well as the *tr* white keys 11, may limit the descent of said *tr* keys to less than the full key drop distance of the host ivories, while yet permitting sufficient such drop for the host sounders to speak, whether the host be a piano or an organ.

The open space 29 above floor 20 and below rear portions 30 of the *tr* keys permits the latter to descend in use, which will occur whenever the *tr* keys are fingered rearwardly of the fronts of the levelizers (or of the fronts of host black ivories if resting on them), in which case floor 20 may act as a downstop for them. By the same token, the levelizers descend along their full length during use, the host white ivories serving as carrier keys for them and they in turn serving in the manner of carrier keys for the *tr* keys above them, whenever the latter are fingered rearwardly of the fronts of the levelizers on which they are resting.

In FIG. 3 spacer beads 13 of FIG. 1 have been optionally replaced by $$\frac{\text{oct}}{7}$$

vertical guide sleeves 31, integral with shiftable front frame 32 which is united to shiftable frame end arms (understood). Optionally—though with certain disadvantages—floor 33 of frame 32 might serve as a down stop for the fronts of the *tr* white keys, in which case front stop rail 14 might be dispensed with.

In FIGS. 4–5, pins 34, pins 35, and roof 36 from which they depend, closely correspond to pins 16, pins 17, and roof 5 of FIG. 1. The configuration of the under surfaces of the roof has been varied, however, to accommodate underlying *tr* key bridge portions 37, ceilings 38 of which overlie tube 4 a sufficient distance to permit the rears of the *tr* keys to descend in use until stopped by floor 39. Non-shiftable frame 40 and its end member 41 correspond to 3 and 2 of FIG. 1, except for differences in rear-front location and dimensions. Lifter rod 42 corresponds to rod 6. Unlike floor 5 of FIG. 1, however, floor 39 rests on and is supported by the rears of the levelizers 42–a, the latter being guided in use by inverted pins 43 and 44 which depend from floor 39 into oversize holes 45 and 46 in the levelizers. Head 47 serves as a cager for the levelizers during installation and deinstallation of the overall assembly into position of use, while recesses 48 are proportioned to allow ample leeway for reciprocation of the levelizers during use.

In FIG. 6 rear guide pins 49 and guide pins 50 frontward of them correspond generally to pins 34 and 35 of FIG. 4, as well as to pins 16 and 17 of FIG. 1, except that it is contemplated that pins 50 will occupy *tr* key-to-key *tr* spaces between frontward extensions 51 of the shiftable frame 52. Besides cooperating with said pins 50, said extensions serve as keys lifters when said frame is rotated clockwise to bring them into engagement with under surfaces 53 of *tr* key upper tail portions 54. The upper surface of non-shiftable frame 55 (as well as that of 40 in FIG. 4, and 3 in FIG. 1) can, of course, carry a *tr* scale, while the upper surface 56 of shiftable frame 52 (as well as roof 36 in FIG. 4, and roof 5 in FIG. 1) can carry a *tr* pointer or arrow.

In FIGS. 7–8 the functioning of the parts will be readily understood in view of the detailed descriptions of FIGS. 1–6 already made. Thus, upward pressure on front 57 of roof 58 will rotate pivot tube 59, united to it by shiftable frame end members (understood) clockwise, thereby raising *tr* keys-lifter bar 60, also united to roof 58 by said frame end members, into lifting engagement with ceilings 61 of windows 61–a in white *tr* keys 62 and black *tr* keys 63; whereupon transpositional shifting may be effected in manner discussed in connection with FIG. 20 below. Spacer beads 64 and 65, integral with side walls of the *tr* white keys, also will be discussed below, in connection with FIGS. 23–24. Front downstop rail 66 is generally similar to rail 14 of FIG. 1, except that it does not underlie any portions of the *tr* black keys. Rear guide pins 67 and more frontward guide pins 68 rigidly depend from roof 58, and may be thought of as either occupying *tr* key-to-key spaces or as extending downwardly through vertical guides sleeves in them.

$$\frac{oct}{12}$$

pins 69 similarly may be thought of as either occupying such *tr* key-to-*tr* key spaces or such sleeves. Partitions 70, floor 71, anchor strip 72, levelizers 73, and recesses 74 in them, correspond generally to, respectively, parts 18, 20, 22, 26 and 25 in FIG. 1. But spacer pins 24 of FIG. 1 are replaced by tuning fork-like spacers 75 having bifurcate rear portions 76 fixed in partitions 70, as clearly appears in FIG. 8, which portions are disposed to limit frontward movement of anchor pins 77 (fixed in the rear ends of the levelizers 73) during their reciprocation in use. Non-shiftable frame member 78 can carry a *tr* scale, complementary e.g. to a *tr* arrow carried by roof 58.

In FIGS. 9–11 anchor rod 79 corresponds to anchor rod 1 of FIG. 1; but no pivot tube such as 4 in that figure is shown. One can optionally be provided, of course, but the assembly will be operative without it, provided friction between *tr* key surfaces 80 and 81 and portions of rod 79 in juxtaposition to them is not excessive, during transpositional shifting along said rod. Such shifting can be accomplished by upward pressure against front 82 of roof 83 to bring relatively frontward guide pins 84, depending from said roof into lifting engagement with the ceilings of recesses 85 in the *tr* keys, and then sliding them as a unit along rod 79. Spacing of the tail portions 86 of the keys will be preserved by rear pins 87 also depending from roof 83. The tops of spacer beads 88 on frontward portions of the white *tr* keys are in the same plane as the ivories of said keys. This is feasible because they are located over ¼ inch or ⅜ inch rearward of the downwardly extending more frontward portions 89 of the keys, so as not to be subject to overlap by the thumb or finger of a player when depressing said front portions. By the same token, the upper surfaces of spacer beads 90 are enabled to be in the same plane with the white ivory carrying them by virtue of the fact that they are on the sides of said white *tr* keys which are in juxtaposition to side walls of adjacent *tr* black keys, so that the finger overlap possibility (which would be presented if the beads were carried by said walls of *tr* black keys) is eliminated without sinking said upper surfaces below said plane at all. This fact also enables the vertical thickness of the *tr* keys to be held to a minimum, e.g. to ⁵⁄₁₆ inch as shown in the drawing, or even to as little as ¼ inch or less.

The levelizers and their guides in FIGS. 9–11 are so similar to those in FIGS. 7–8, already described, that it will suffice merely to point out that in FIGS. 9–11 anchor pins such as 77 of FIGS. 7–8 are replaced by downwardly depending rearward wall portion 91, disposed immediately rearward of transverse slot 92 in the levelizers, which slot loosely sleeves over cross portion 93 of the tuning fork-like pins.

In FIGS. 12–17 parts will be identified (as already done in several above instances) by the same respective numerals as may appear for them or closely similar analogs on FIGS. 1–2. Thus, anchor strip 22 is shown in FIG. 12 as cut away near its bass end (similar cutting away at its treble end being contemplated) to avoid conflict with control pistons or the like; while in FIG. 13 anchor strip 22 is shown with its upper portion also optionally cut away, floor 20 with its rear portion cut away, and partitions 18 with slightly different configuration than in FIGS. 1–2, but said parts being otherwise substantially similar to their analogs in FIGS. 1–2.

Referring to FIGS. 12, 14 and 16 in particular, floor 20 is provided with $$\frac{oct}{12}$$

lock furrows 94 which optionally may receive rear bottom portions 95 of shiftable frame end arms 96. Front down-stop rail 14 similarly is provided with $$\frac{oct}{12}$$

lock furrows 97 for receiving front bottom surfaces 98 of said arms 96. Non-shiftable frame end arm 99 rigidly interunites said floor 20 and said rail 14. Tr scale bar 100 and anchor rod 1 similarly rigidly interunite the upper rear portion of said arm 99 with a similar arm at the treble end of the non-shiftable frame. Optionally, frontwardly extending arm 101 (appearing only in FIG. 12) can rigidly interunite anchor strip 22 with rail 14, the terminal levelizer 102 optionally being made extra narrow so that said arm 101 can be given ample width for strength, in which case collective support from host white keys can make support from host end block 103 and its treble-end counterpart unnecessary. This is especially the case when the overall *tr* assembly is used on a host having numerous extra keys at each end, so that the endward extensions of rail 14 can rest on the fronts of the extra host white keys and consequently derived adequate support merely from the host white keys. By the same token, partitions can be inserted as shims beneath endward portions of floor 20, to impart collective hold-up force from the rears of the host white ivories to the endward extensions of said floor 20. The holes 28 in the end extension of lamina 21 are inactive, as shown; but in case the assembly is placed on a host where said endward portion of lamina 21 overlies host keys, individual levelizer units can be inserted beneath the holes and pins 27 be fed into them, thereby in effect making the overall assembly adjustable as to ranges of transpositional shiftability in one direction as compared with the other.

Hole 104 in arm 96 (FIG. 16) receives the bass end of tube 4 (FIG. 1), thereby integrating it to arm 96.

The construction and ready removability of flag or curtain 105 (FIGS. 14–15) is believed manifest, in view of the reference already hereinabove made to it, and the cantilever type of support for it shown in FIG. 15. Similarly, it is believed that the construction and operation of the shiftable frame end arms and parts carried by them in FIGS. 18–21, respectively, will be clear from the numerals appearing on them and the descriptions already hereinabove made of the parts designated by said numerals, in FIGS. 4, 6, 7, and 9. It will be particularly observed, however, that hole 105-a in FIG. 19 merely slides along rod 1 (FIG. 6) without holding any tube such as 4 of FIG. 1, although frame 52 itself (FIG. 6) in effect functions as such a tube. It will further be noted, in this connection, that hole 106 in FIG. 21 and its opposite end counterpart merely slide along rod 79 (FIG. 9) without holding any such tube as aforesaid. As already indicated, however, cumulative frictional drag of tr key surfaces 80 and 81 (FIG. 9) on rod 79 may make it advisable to incorporate such a tube in the FIG. 9 embodiment.

In FIG. 22 floor 20 is supported solely by levelizers 107, so that no partitions resting on host keys are available as centering means. Consequently, thin partitions such as 108 are provided, not necessarily to contribute support by resting on host ivories, but rather to depend from floor 20 into the spaces between levelizers 107 and adjacent tr black keys, and thereby constitute the centering means for the assembly.

In FIGS. 23–24 spacer beads 109 are carried by tr white keys 110 on side walls thereof adjacent tr black keys 111, so that there can be no finger overlap onto said beads 109 in any case; whereas if the beads were carried by said black keys a finger pressing down on an adjacent white key manifestly would be apt to overlap the bead and so carry the black key down too. In the case of spacer beads 112, however, the problem of overlap is different, and is met by locating the beads at such a low level that a player's thumb or finger, even in the down position of the key, will not impinge on the upper surface of the bead. Such low placement of the beads 112 is exemplified e.g. in the case of beads 13 (FIG. 1); while rearwardness of placement of spacer beads on the wide front portions of tr white keys, to remove them from danger of thumb or finger overlap without placing their tops below the plane of the ivories, is exemplified e.g. in the cases of beads 65 (FIG. 7) and 88 (FIG. 9). It is contemplated that one of the white tr keys will carry a spacer bead 112 on each of its sides, so that each terminal tr white key will be provided with a bead on its far side, adjacent to shiftable frame end arms such as 96 (FIGS. 16–21).

As drawn, the octave length in each of the diagrammatic series in FIG. 24 was 3 and 3/16 inches (slightly shorter than 1/2 scale for the usual 6 and 15/32 inch octave length in piano and organ manuals). Also as drawn, the width of the levelizers (designated c, d, e, f, etc.) was 3/16 inch, which would correspond to about 3/8 inch if in full scale; and the width of the black caps at their bases was uniform in both series. But the widths of the tr white keys' rearward portions (depicted by the rectangles in the upper series) were not exactly uniform; instead, they were drawn in accordance with the slightly differing widths (and consequent differences in center-to-centering) which is usual in piano and organ manuals, wherefore the possibility of encroachment by descending tr keys or their beads or levelizers or host black caps beneath them, needs to be taken into account. And close inspection of FIG. 24 with this in mind will show that in case, e.g., of the four semitones of downward transposition depicted therein, the beads on the right sides of the tr f and d keys (if not located well frontwardly of the d and f levelizers below, and to the right of them) might come close to impinging on them; in view of which it would be of advantage to make the levelizers, or said beads on the keys above them, slightly narrower. Additional narrowing might be in order too, if the octave length chosen for the tr manual were different from that of a particular host on which it was to be used; as to which cf. '942, FIG. 11, and text descriptive thereof. It may be noted at this point that each of FIGS. 7, 9, 27, 28 and 1 exemplifies the aforesaid frontward locating of beads such as 109. And it may be further remarked, that the presence of front down stop rail 14 with its consequent reduction in the drop of the tr ivories, lessens the possibility of impingement by a tr key on a host black cap beneath it, since the walls of such caps converge upwardly, as a result of which the danger of impingement on them near their base decreases in proportion as the drop of the tr keys is lessened by said rail 14.

In FIGS. 25–26 inverted guide pins 113 and 114, depending from roof 5, occupy guide sleeves 115 and key-to-key spaces 116 respectively, in manner exemplified e.g. in FIGS. 1, 4, 6, and 9. The vertical space-saving advantage provided by the inverted guide pins in the case of tr keyboards is manifest, as also is the corresponding advantage in the case of inverted levelizer guide pins (exemplified e.g. in FIGS. 1 and 4).

In FIG. 27 cover 117 is optional, and either it or roof 5 can carry instructions for use of the assembly, as well as a tr pointer or arrow. It is believed that the functioning of the guide pins, longitudinal rods, holes in the keys for them, spacer beads, and front down-stop rail in FIG. 27 will be obvious from what has already been said; also, locking via lowering of bottom rear surfaces 95 into furrows 94. Levelizers 118, however, differ from those exemplified in the earlier figures in that they are disposed entirely frontward of partitions 18 and are held in coalinement by pairs of inverted guide pins (unnumbered) both of which depend from frontward extension 119 of floor 20. Freedom for downward movement, despite the frontwardness of the location of the levelizers 118 on the host keys beneath them, is provided by the upward re-entrances 120, which insure ample space for descent of thin tail portions 121 of the levelizers.

It will be noted that the rears of the tr ivories in FIG. 27 are located so far frontward as to be less than 2 1/2 inches—in fact less than 1 3/4, 1 1/2, or 1 1/4 inches rearward of the fronts of the levelizers. This frontwardness of location appears to provide a very definite and unique mechanical advantage in the playing of the tr keys, and seems to result in a substantially improved playing feel, as compared with that of the host keys beneath them. Moreover, the excessive ivory drop at the fronts of the tr keys which would otherwise accompany said advantage is avoided by the presence of the front down-stop rail 14.

Said enhanced mechanical advantage and consequent improvement in playing feel of the keys of the FIG. 27 embodiment make it particularly suitable for use by persons with weak fingers (e.g. young children or invalids), or persons to whom the amount of finger force needed for playing or practicing on the average piano is onerous; and this, irrespective of whether said keys are in a tr or a non-tr assembly (levelizers being contemplated in either case, however).

In FIG. 28, the functioning of the parts corresponds to that in FIG. 27 except that open space 122 has been provided above tube 4 to permit tr key tail portions 123 to descend in use until stopped by floor 20, frontwardness of placement of front levelizer pins 124 has been facilitated by introduction of upward recesses or re-entrances 125 in the levelizers 126, and space for longitudinal frame number 127, from which pins 124 depend, has been provided by upward recesses or re-entrances 128 in the bodies of the tr keys. It may be further noted that the tr keys do not extend as far frontwardly in FIG. 28; also, that open space such as 122 can readily be provided in the FIG. 27 embodiment and be helpful even if substantially narrower than shown in FIG. 28.

In FIGS. 29–30 the solid arrow represents application of finger down-force to a rearward portion of a tr key 129 during use, and the front and rear dash-line arrows represent component fractions of said force bearing downward at point of intercontact 130 with underlying levelizer 131 (in the case of the front arrow) and on the fulcrum 132 of the *tr* key 129 (in the case of the rear arrow); said fulcrum of course being part of the *tr* frame structure. This division of force not only causes special heaviness of touch of rearward portions of *tr* keys such as 129, but where the *tr* frame structure is supported solely by underlying host white keys, it may even depress such frame structure to the point of possibly making host sounders speak, i.e. in the case of organs.

In FIGS. 31–35 the *tr* key 133, levelizer 134 and host piano white key 135 are shown in progressively differing situations, the last of which (FIG. 35) depicts the optimum solution of the division-of-finger-force problem exemplified in FIGS. 29–30. Thus, vertical plane 136 (depicted by the frontward long-short dash line) manifestly includes the rearwardmost point on the fulcrummed *tr* key 133 in FIG. 31 at which the application of a down force will depress the underlying levelizer without producing a component of down force on the fulcrum of the *tr* key. This will be evident from inspection of the positions assumed by the parts in FIGS. 32–34. But it will be noted that the absence of a fulcrum anchoring the *tr* key in FIG. 33 has permitted it to ride downward passenger-like on the levelizer 134, thereby avoiding the sliding friction between the bottom of the key and the top of the levelizer which has inevitably occurred in FIG. 32, and that the absence of a fulcrum anchoring the levelizer in FIG. 34 has permitted it to ride downward as a passenger on the host key beneath, thereby eliminating the sliding friction between the bottom of the levelizer and the top of the host key which must have occurred in FIG. 33; whereas in FIG. 35, due to omission of both said fulcrums, both of the aforesaid frictional effects have been avoided, and in addition said vertical plane 136 has in effect been shifted rearwardly to the position depicted by long-short dash line 137 on FIG. 31.

Hereinafter, any plane which intersects the front-to-rear axis of the ivory of a *tr* key at right angles and includes a vertical line along which downward finger force exerted on the key's ivory will not produce any component of down force on rearward *tr* frame structure, will be referred to as a "full-force" plane. And it may be remarked at this point, that it is generally advantageous to locate the rear of the ivory of the *tr* key frontwardly of a vertical plane which is parallel to the rearwardmost such full-force plane and located not more than 1¼ inches, better 1, ¾, ½, ¼ inch, or not at all, rearwardly of said rearwardmost full-force plane. Doing so minimizes the aforesaid division-of-finger-force problem, and minimizes rearward rocking such as depicted in below-discussed FIG. 41.

It will be noted that the rears of the *tr* ivories in each of FIGS. 1, 4, 6, 7, 9 and 27 are in fact frontward of the rearwardmost full-force planes (understood) in them, so that neither any division of finger force, nor any rearward rocking such as aforesaid, can occur in them. And it will be clear from FIGS. 1, 4, 6, 7, 9 and 28, moreover, that in them the *tr* keys ride as passengers on the levelizers, and the levelizers in turn as passengers on the host keys, at all points which are frontward of the rears of the *tr* ivories and rearward of the fronts of the levelizers. This constitutes what may be termed a dual-passenger interrelationship; which interrelationship advantageously will extend from the vertical plane that includes the front of the levelizer, rearwardly at least 1 inch, better 1¼, 1½, 1¾, 2, 2¼, 2½, 2¾ or even more inches.

In FIGS. 36–38 levelizers 138 are swingably pivoted on axle 139 via rearwardly extending thin metal facings 140 that freely penetrate slits 141 in support bar 142. Equalization of the drop of the *tr* ivories along their longitudinal axes is approximated by providing $$\frac{oct}{12}$$

springs 143 in front frame portion 144, the resistance of said springs to down pressure advantageously being the same as that of the host key returner agencies. The forward ends of all the *tr* white ivories being closer to the line of the fronts of the host black ivories and levelizers than to that of said springs, finger pressure at any point on a *tr* white ivory front will cause it to drop appreciably, as the host black key or levelizer contacted by its bottom surface 145 does. And finger pressure at the rear of any *tr* ivory will of course likewise cause it to drop, as its bottom surface again drives such host key or levelizer down. It follows that a substantial degree of *tr* ivory drop will occur no matter where the ivory is fingered. Adjustability of the strength of the springs 143 to conform to the key action weight of a particular host can be provided as indicated at 146. Down stop 147 may be used to limit down movement of forward extensions 148 of the *tr* key bodies. Rear stems 149 and front stems 150, reciprocating between $$\frac{oct}{12}$$

spacers (understood) in rear frame portion 151 and front frame portion 152, serve as stabilizers. The rear contours of stems 149 and the front contours of stems 150 are designed to preclude the occurrence of any wedging of the *tr* keys between the inner facing of rear frame portion 151 and that of front frame portion 152, incident to any unevenness of drop along their length during use. Windows 153 lighten the weight of the keys. During non-use or transportation, rear frame roof 154 and front frame bottom 155 (also spring pin 156, stop 147, etc.) serve to keep the *tr* keys caged; while during use, fin 156-a occupies a host key-to-key seam, to serve as a centering agency.

In FIG. 39 the ceiling of eye 157 has been forced downward into contact with fulcrum 158, with the result that any finger pressure exerted on *tr* key 159 frontwardly of said fulcrum and rearwardly of arrow 160 is divided between the fulcrum and the host key. On the other hand, the slight variation of the fulcrum and enlargement of the eye in FIG. 40 has prevented such ceiling from interfering with full descent of the levelizer as a passenger on the host key; wherefore the full-force plane to be considered would be the one including the rear boundary 161 of the ivory on FIG. 40 when it was in the up position. This would differ from the plane signified by the arrow in FIG. 40 only to the extent of the substantially negligible difference in front-rear location of boundary 161 that downward arcing of the host key might bring about.

It may be further observed that the above described test of locating the rear of the *tr* ivory frontward of a vertical plane located a specified distance rearward of the rearwardmost full-force plane, is also applicable when the latter is determined in the down position of the parts, rather than their up position. In other words, it is believed that said test defines novelty whether applied in the up position or the down position of the parts. But reference to a full-force plane, or the rearwardmost one, hereinafter, will means as determined in the up position of the parts, unless the down position is specified.

Referring to FIGS 41–43, it is believed that the functioning of *tr* key 162, host black key 163 (having a downward slope 164 commencing about two inches or a little more, rearwardly of its front), and of floor 165 acting as a down-stop for rearward portion 166 of the *tr* key 162—said portion 166 having a frontward face 167 disposed to slide downwardly in moving contact with anchor rod 168, and said portion 167 slanting rearwardly about 3 or 5 degrees to about 25 or 30 degrees, to accommodate to the usual arcing of the host key below—will be apparent; but it may be remarked that for purposes of applying the aforesaid rearwardmost full-force plane test, the rearward boundary 169 of the ivory of said key 162 is to be considered.

It will be noted that any finger pressure rearward of the up-pointing arrow on FIG. 41 will, in depressing the rear portion of the host key 163, tend to raise the front end of the *tr* key 162, thereby changing the position normally rest on said members 272 and 273 (the same being rigidly united by *tr* frame end members 274 and 275) as at 276 and 277, the upward movement of members 272 and 273 caused by said lifting will serve to raise the gates. And continued raising of the lifter keys will then cause upstop bars 278 and 279 (rigidly united by bass end piece 280 and treble end piece 281) to liftingly engage the tops 282 of windows 283; whereupon the shifting can be done through the thus opened gates, and with front downpusher portions 284 of the *tr* key bodies 285 (all of which bodies are alike except for their ivories and the fronts of their whites) raised clear of $$\frac{oct}{12}$$

guide pins 286, and frame member 272 raised clear of $$\frac{oct}{12}$$

furrows 287 in casing 288, in which furrows $$\frac{oct}{12}$$

locking cogs 289 on the under side of member 272 normally seat.

Non-shifting under levers 290 are schematic for any key levers or other yieldable tone actuators disposed to receive down motion of downpusher portions 291 of "handles" 292 of cane-type equalizers 293 (such as exemplified in FIG. 6 of '728) on which *tr* keys' downpusher portions 284 rest. In fact said equalizers could be omitted entirely if, e.g. under levers 290 were piano or organ key levers of customary length and so modified that the portions of them underlying *tr* key bodies 285 were all identical. In such case however, the rear walls of windows 283 would need to slant rearwardly a little, to allow for arcing during use.

Guide walls 294, 295, 296 and 297 (FIG. 57) function similarly to walls 255 and 256 of FIG. 54 to confine end pieces 280 and 281 and consequently prevent—via bars 278 and 279 functioning similarly to bars 250 and 249 of FIGS. 51 and 54—axial displacement of the *tr* keys.

Since the *tr* keys are "passenger keys" stabilization not only at frontward and rearward but also at upper and lower loci is provided. Thus, in addition to the stabilizer action of spacers 266 and 268 already identified, stabilization is contributed by $$\frac{oct}{12}$$

spacers 298 and 299, respectively integral with bars 278 and 279; spacers 300 integral with the *tr* white key rears and reciprocating during use in those of the guide sleeves 271 which are not occupied by spacers 268; and spacers 301 projecting forwardly from *tr* rear frame member 273 and about which guide sleeves 302 in *tr* key bodies 285 reciprocate during use.

Guide pins 286 also contribute stabilization to the *tr* keys via guide sleeves 303 of the latter which reciprocate along them during use.

Although *tr* key bodies 285 preferably are made of anti-friction polymer or all their rub surfaces coated therewith, it may be desired to specially weight the lower rear portions of said bodies to counter any tendency toward sticking in the up position, due to slight friction between rear spacer elements and their guides.

In order that a white *tr* key, when pressed down by a player's thumb at the front end, shall not tend to tip frontwardly to a bothersome extent, but descend in unbroken contact with its carrier key below, frontward downpusher portions such as 284 (FIG. 55) and areas 263 (FIG. 51) should lie in the vertical plane which is parallel to the vertical plane that includes the rears of the *tr* white ivories and is frontward thereof a distance at least equal to $\frac{3}{4}$, better $\frac{4}{5}$, still better $\frac{9}{10}$ or, preferably, $\frac{19}{20}$, the length of a *tr* white ivory. Similarly, in order that a white *tr* key, when pressed down at its rear end, shall not tend to tip rearwardly to a bothersome extent, but descend in unbroken contact with the carrier key below, locus rearward downpusher portions of areas of the key should lie in the vertical plane which is parellel to the vertical plane that includes the fronts of the *tr* white ivories and is rearward thereof a distance at least equal to $\frac{3}{4}$, better $\frac{4}{5}$, still better $\frac{9}{10}$ or, preferably, $\frac{19}{20}$ the length of a *tr* white ivory. Since white ivories of pianos and organs generally are not over about 5¾″ in length, or less than about 4½″, it may also be stated that the frontward downpusher portions or areas should not be more than 1¼″, better ⅞″, still better ⅝″ or, preferably, ⅜″ or ¼″ rearward of the vertical plane which includes the fronts of the *tr* white ivories, and that the rearward downpusher portions or areas should not be more than 1¼″, better ⅞″, still better ⅝″, or, preferably ⅜″ or ¼″, frontward of the vertical plane which includes the rears of the *tr* white ivories.

Corresponding considerations of course also apply in the case of the black *tr* keys and their ivories.

At this point it may be observed that in the practice of the embodiment of FIG. 51 said fractions and dimensions apply to areas 263 but not otherwise since the *tr* keys of FIG. 51 are anchored at their rears by their pivot portions 245 and sleeves 246.

In the case of under levers such as 238 of FIG. 51, not only minimization of differential arcing at rub points, with attendant wear, but of "pumping" (i.e., leverage tending to force pivot portions 245 upwardly against the ceilings of their sleeves 246) is aided by the frontwardness of areas 263.

Such frontwardness of operative intercontact between an overlying playing key and an underlying tone-actuating lever disposed to be pushed down by said playing key during use, is believed novel, and contrasts, e.g., with the rearwardness of the contacts between overlying white keys and under levers below them appearing in U.S. Patent 2,141,765 (cf. locus of its screws 41). Further illustrations of said prior art rearwardness are to be found quite generally, in patents where the under levers are ivory-capped key levers of a host instrument and the keys overlying them are piano-type keys of a portable transposer assembly.

Since the less the descent of a piano key ivory at its rear, the greater the finger force required for producing a given volume of tone, it is desirable that such descent approximate, as nearly as feasible, the descent at the front of the ivory. And even in the case of organs, where only the closing of an electrical circuit may be involved in the depressing of a key, the player will nevertheless customarily be used to a substantial degree of ivory down movement, so that lack of it will represent an undesirable circumstance even in that case. Consequently, it may be stated generally, and even apart from the above-analyzed division-of-force problem, that the descent of the rears of the ivories of the *tr* keys of the invention advantageously will be at least $\frac{1}{5}$, better $\frac{1}{4}$, $\frac{1}{3}$, $\frac{1}{2}$, $\frac{2}{3}$, or even equal to, that at their fronts.

Owing to the fact that existent manufacturing designs of keyboard type musical instruments as a rule comprise a variety of structural arrangements immediately (or not far) rearwardly of their stop rails, minimization of occasion for revision of such designs is a major object of the invention. On this score, it may be stated generally that the rearwardmost shiftable longitudinal member of the frames in the devices or assemblies of the invention should extend not more than about $\frac{1}{4}$, $\frac{1}{5}$, $\frac{1}{7}$, $\frac{1}{8}$ or $\frac{1}{10}$ (if at all) the *tr* keys' white-ivory length rearwardly of the vertical plane which includes the rears of the white ivories of said keys.

In connection with the preceding two paragraphs, it is pertinent to remark that FIGS. 51 and 55 (among others).

as filed, were meant to be full-scale, so that measurements of dimensions on them might be made with substantial accuracy. Thus, inspection of FIGS. 51 and 55 will show that they exemplify the most preferred range indicated in the first of said two preceding paragraphs, and that they respectively meet the ranges in the second of said two paragraphs as follows:

not over about ¼ etc., in the case of FIG. 51;
not over about ⅛ etc., in the case of FIG. 55.

Referring again to FIG. 36, it may be remarked that it illustrates the fact that the holding means needed to prevent front-rear displacement of the *tr* keys need not be located solely at their rears, since, as illustrated by front frame portion 152 of said figure, such holding means may even be disposed at a location not only frontwardly of the white ivories but in fact frontwardly of the entire key.

With reference to the matter of freedom of downward play for the rear ends of the *tr* keys and levelizers, it is believed that such freedom is not something that would happen unintendedly, or merely as a result of wear. This belief is based on the ever-present effect of gravity. In other words, even though a support surface or a surface supported by it, be considerably worn away, as by friction, gravity may be expected to pull such surface downward, pro tanto, unless the structure comprising such latter surface has deliberately been designed to prevent it.

Although appropriate felting or other sound-deadening medium is contemplated for wherever needed, in the devices of the invention, it may be particularly pointed out that in embodiments such as that of FIG. 1, pivot tube 4 advantageously can be provided with a felt jacket, or a felted auxiliary up-stop member can be incorporated to limit up-movement of the rears of the *tr* keys, and/or ⅟₁₆″, more or less, of open space be provided between the bottom of said tube or member and the underlying surface of the *tr* key's rear, e.g. by higher placement of the tube.

When the assembly comprises a front down-stop rail for the *tr* white keys that is a part of the shiftable frame, e.g. as mentioned hereinabove in connection with FIG. 3, i.e., united to the end arms of said shiftable frame, it is contemplated that said end arms will receive support not only from rearward portions of host end blocks or auxiliary end blocks, but as well from frontward portions thereof, e.g. in the manner of end arm 96 of FIG. 16 or end arm 206-*a* of FIG. 47. While this construction makes it feasible to do without a non-shiftable stop-rail such as 14 of FIGS. 1, 14 and 16, and to use far-frontward guide means such as sleeves 31 of FIG. 3, it has the relative disadvantage of involving make-and-break contact with the end blocks whenever tranpositional shifting is done, and also entails a certain amount of extra frontward weight and dimension, i.e., as compared e.g. with the situation in FIG. 1.

It will be noted further that the end arms of the non-shiftable frames of the invention can be similarly supported as e.g. in the FIGS. 46–50 embodiment.

It will be noted that a number of the instant drawings, e.g. FIGS. 1, 4, 6, 7, 9, 27 and 28, illustrate white *tr* keys whose frontward bottom surfaces, in extending rearwardly, make upward and then clockwise (as viewed in treble-side elevation) angles, thereby providing space for underlying frame structure or a front down stop rail without need for undue elevation of the ivory thereabove or sacrifice of depth of the front of the key, and whose rearward bottom surfaces, in continuing rearwardly, again make upward and then clockwise angles, thereby imparting an upwardly offset configuration to said bottom surface which furnishes space for underlying frame structure such as a rear down stop rail and/or for descent of the rear of the key during use. In the same connection, it may be remarked that the analogous contouring of the bottom surfaces of the levelizers in FIGS. 27 and 28 likewise imparts an offset configuration to them, which permits descent of the rears of said levelizers during use notwithstanding the underlying heads (unnumbered) of inverted levelizer guide pins such as 124 of FIG. 28 (said heads serving as cagers during installation, etc., as already explained).

Hereinafter, or in the appended claims, the expression "manual component" will be used to identify either a key or a designated portion of one (as e.g. the body portion underlying its ivory) or a non-key element such as a keys-levelizing member or levelizer.

Reference hereinafter, or in the appended claims, to "the plane of the ivory" of a white *tr* key, will generally designate, of course, a plane which includes the full area of the ivory, since the entire ivory area of usual piano and organ type white keys is flat, and so is included in a single plane. But should the white key in a particular case happen to be of the unusual sort wherein the wide front portion makes an upward or downward angle with the narrow rearward portion, said "plane" would be regarded as the one which includes the flat part of said ivory that begins in, and extends rearwardly from, the line which is tangent to the fronts of the black ivory caps at their base. Insofar as applicant can recall, all piano and organ type white keys, of any sort, have flat parts such as thus designated; so that use of them to determine said "plane" will be free from difficulty in any case. In the same connection, and bearing in mind that organ black key caps often slope downwardly toward their rears (as, e.g., "slope 164" of black key 163 in FIG. 41), reference to "the plane of the ivory" of a black *tr* key will designate the plane which includes the flat front portion of the ivory of such key, and (unless otherwise designated) will be understood to be parallel to the above defined plane of adjacent white *tr* ivories.

It will be apparent that many changes in the physical embodiments of the invention and its novel aspects may be made within the scope of the appended claims without departing from the spirit of the invention.

What is claimed is:

1. A transposing device for a keyboard type musical instrument comprising
   (a) a first frame and a plurality of elongate keys-levelizing members associated therewith, extending frontwardly therefrom in approximately horizontal disposition, and having frontward upper surfaces disposed in a common plane,
   (b) a second frame and a chromatic series of piano type keys associated therewith, said keys having downpusher portions for contacting said surfaces to depress said members during use, said second frame having a longitudinal member which overlies said common plane, and said series being transpositionally shiftable as a unit along said first frame, and
   (c) first means for holding said keys against frontward displacement during use, said first means permitting the rearwardmost portions of said keys freedom of downward play during at least part of the descent of said keys during use.

2. The transposing device of claim 1 wherein
   (d) said first means permits said rearwardmost portions freedom of frontward play concomitantly with said freedom of downward play, and
   (e) said freedom of downward play is at least ⅟₄₈ inch.

3. The transposing device of claim 2 wherein said keys-levelizing members are levelizers, and which comprises
   (f) second means for holding said levelizers against frontward displacement during use, said second means permitting the rearwardmost portions of said levelizers freedom of concomitant frontward and downward play during at least part of the descent of said levelizers during use.

4. The transposing device of claim 2 which comprises
(g) down-stop means underlying downwardly facing rearward surfaces of said keys for limiting their said downward play,
(h) means providing a fulcrum for rearward portions of said keys when they are subjected to down pressure at loci frontwardly of the fronts of said keys-levelizing members, and
(i) down-stop means disposed frontwardly of said fronts, for limiting down movement of frontward portions of at least the white keys of said series.

5. The transposing device of claim 3 wherein
(j) the rear boundary of the ivory of each white key of said series is disposed frontwardly of a vertical plane which is parallel to and located not more than 1¼ inches rearwardly of the rearwardmost full-force plane of the key.

6. The transposing device of claim 4 which comprises
(k) a frame member overlying rearward portions of said keys, and
(l) a series of guide members depending from said frame member for guiding said rearward portions during use.

7. The transposing device of claim 6 which comprises
(m) a further series of guide members for guiding rearward portions of said keys, said further series being disposed rearwardly of said first mentioned series.

8. A tr assembly comprising a piano type manual, a chromatic series of piano type tr keys and a plurality of levelizers operatively associated, with said series, and with white ivories of said manual, wherein
(a) said levelizers are passenger levelizers on said white ivories over a front-rear distance of at least one inch and
(b) said tr keys are passenger keys on said levelizers over a front-rear distance of at least one inch directly above said first mentioned one inch;
(c) whereby, in response to application of downward finger force on said tr keys anywhere along a distance of at least one inch directly above said distances, said keys descend as passengers on said levelizers and said levelizers descend as passengers on said white ivories.

9. The tr assembly of claim 8 which comprises
(c) an anchor rod which is stationary in use and disposed to prevent frontward displacement of said tr keys during use, and wherein
(d) rearward portions of said tr keys present rearwardly slanting upwardly extending frontwardly facing surfaces, which surfaces are disposed to move downwardly in rearward juxtaposition to said anchor rod during descent of said tr keys in use, whereby said frontward displacement is prevented.

10. The tr assembly of claim 9 wherein
(e) said surfaces are disposed at an angle within the range of 5 to 30 degrees from a line normal to the plane of the ivory of the tr key.

11. The assembly of claim 10 wherein
(f) said angle is within the range of 8 to 20 degrees from a line normal to the plane of the ivory of the tr key.

12. In a tr assembly comprising a chromatic series of piano type keys and a plurality of levelizers operatively associated therewith,
(a) a pair of mutually adjacent tr white keys and a pair of tr black keys one of which flanks the outer wall of one of said white keys and the other of which flanks the outer wall of the other of said white keys,
(b) each said outer wall carrying a spaced bead and being disposed for reciprocation with said bead in juxtaposition to the black tr key respectively flanking said outer wall,
(c) need for sinking the top surface of the bead below the plane of the tr white ivories, to avoid risk of finger overlap during playing, being thereby obviated.

13. The tr assembly of claim 12 wherein
(d) a said spacer bead is disposed frontwardly of the vertical plane which includes the fronts of said levelizers.

14. In a tr assembly comprising a chromatic series of piano type keys and a plurality of levelizers operatively associated therewith,
(a) a non-shiftable sub-assembly comprising a bass-end block, a bass-end arm, a treble-end block and a treble-end arm,
(b) a down-stop rail disposed frontwardly of said levelizers and united to said base-end arm and a treble-end arm,
(c) each said arm being supported in position of use by a frontward portion of one of said end blocks.

15. An auxiliary keyboard for use in operative association with the keys of a piano, which keyboard comprises
(a) a chromatic series of rearwardly pivoted piano type keys,
(b) a plurality of elongate rearwardly pivoted levelizers disposed for being operatively associated with the keys of said piano and of said series,
(c) each white key of said series having an ivory whose front boundary is located at least ¾ the length of said ivory frontwardly of the rearwardmost full-force plane of said white key, and
(d) a down-stop rail disposed frontwardly of said levelizers, for limiting the down movement of the front portions of said white keys during use, whereby
(e) auxiliary mechanical advantage is supplied for the keys of said piano, while excessive drop of the fronts of the white keys of said series during use therewith is prevented.

16. A transposing device for a keyboard type musical instrument comprising a series of under levers and a plurality of keyboard type keys, said plurality being transpositionally shiftable along said series and said series serving as respective levelizing means for said keys; said keys resting on said under levers at loci lying in a common elevation which loci coincide with a vertical plane which is parallel to the vertical plane which includes the rears of the white ivories of said plurality and is frontward of said last mentioned plane, a distance equal to at least ¾ of the white-ivory length of said keys.

17. The transposing device of claim 16 wherein said distance is equal to at least ⅘ the white-ivory length of said keys.

18. The transposing device of claim 16 wherein said keys respectively rest on said under levers at additional loci lying in a common elevation which additional loci coincide with a vertical plane which is parallel to the vertical plane which includes the fronts of the white ivories of said plurality and is rearward of said last mentioned plane a distance equal to at least ¾ the white-ivory length of said keys.

19. The transposing device of claim 18 wherein said last mentioned distance is equal to at least ⅘ the white-ivory length of said keys.

20. A keyboard type musical instrument comprising a series of carrier keys and a plurality of passenger keys shiftable into selected transpositional inter-relationships with said series; each of said passenger keys respectively resting on and being solely supported by one of said carrier keys at at least two loci, one of which loci is at least ⅘ the ivory length of the passenger key from one of its ends, and the other of which loci is at least ⅘ said ivory-length from the other of its ends.

21. A transposing device for a keyboard type musical instrument comprising a shiftable frame carrying a plurality of piano type keys the rears of whose ivories are disposed to descend at least ¼ as much as their fronts during use; said shiftable frame comprising a rearwardmost longitudinally extending frame member whose rearwardmost portion extends not more than ¼ the white-ivory length of said keys rearwardly of the vertical plane which includes the rears of the white ivories of said keys.

22. The transposing device of claim 21 which comprises a non-shiftable frame, endward portions of which are respectively disposed in a bass-end housing and a treble-end housing; said device also comprising lock means disposed in at least one of said housings; each said housing having roof structure which normally overlies terminal keys of said plurality.

23. A keyboard musical instrument comprising at least 25 sounders disposed in semi-tone succession, a transpositionally shiftable manual that includes two series of piano type ivories, in each of which series there are 12 ivories per octave length, operatively associated with said sounders to sound the chromatic scale when consecutively depressed during use, each ivory in each of said series being in fixed union with and carried by a single-shanked crank type equalizer; all of the equalizers in said series being fulcrumed at a common level, the shanks of the equalizers in one of said series being canted trebleward, and the shanks of the equalizers in the other of said series being canted bassward.

24. A transposing device for a keyboard type musical instrument comprising a first frame having lock means thereon, a second frame holding a plurality of keyboard type keys, being transpositionally shiftable along said first frame, and comprising a liftable member having locking means thereon which locking means are complementary to said lock means; at least one of said keys being disposed, on being lifted, to lift said liftable member and thereby disengage said locking means from said lock means, and a plurality of said keys being provided with closely superjacent ceiling structure serving to preclude lifting of keys of said plurality sufficiently to accomplish said disengagement.

25. The transposing device of claim 20 which comprises a housing overlying terminal keys of said plurality and lock means for securing said second frame against endward displacement during use; said lock means being located in said housing.

26. A piano type white key having an ivory consisting of a first rectangular portion which is about ⅞ inch wide and a second rectangular portion which is narrower than said first rectangular portion and whose front adjoins the rear of said first rectangular portion, said first rectangular portion having a rear edge which makes a right angle with a side edge of said second rectangular portion at the front end of said side edge, wherein, in position of use,
  (a) the bottom surface of said key, in extending rearwardly, makes a first upward angle at a locus frontward of the vertical plane which includes said rear edge, makes another upward angle at a locus rearward of said vertical plane, and thereafter makes an angle which is clockwise as viewed in treble-side elevation, and
  (b) said key comprises at least one frontwardly facing, upwardly extending wall surface located rearwardly of said vertical plane and bounded by outer side surfaces of said key,
  (c) whereby low positioning of the ivories of a series of such keys in a keyboard assembly designed for placement above and in operative association with a host keyboard assembly and comprising longitudinal members for respective positioning in rearward proximity to each said upward angle and in frontward proximity to said wall surface is facilitated, without necessitating sacrifice of depth of the front of the key.

27. The key of claim 26 wherein
  (d) said bottom surface includes an area which is located between said vertical plane and said another upward angle, is approximately parallel to said ivory, and is at least ½ inch in front-rear dimension.

28. The key of claim 26 wherein
  (e) said area is at least 1¼ inches in front-rear dimension.

29. The key of claim 26 wherein
  (f) said area is at least 2 inches in front-rear dimension.

30. The key of claim 27 which also comprises
  (g) a guide sleeve disposed more rearwardly than said frontwardly facing wall surface and extending downwardly through said key,
  (h) whereby sidewise displacement of the rear portion of said key may be prevented via placement of an upright guide member in said sleeve.

31. A *tr* keyboard assembly comprising
  (a) a chromatic series of piano type keys, which series comprises a plurality of white keys conforming to claim 26,
  (b) means holding each key of said series against displacement during use, and
  (c) a front down stop rail underlying the wide front portions of said white keys and disposed rearwardly of said first upward angle of each of said white keys and frontwardly of said vertical plane.

32. The keyboard assembly of claim 31 which also comprises
  (d) a rear down stop rail underlying rearward portions of said white keys and disposed rearwardly of said another upward angle.

33. The *tr* keyboard assembly of claim 31 which also comprises
  (e) motionless-in-use anchor means disposed in frontward juxtaposition to each said upwardly extending wall surface, whereby frontward displacement of said white keys during use is prevented.

34. A *tr* keyboard assembly comprising
  (a) a chromatic series of piano type keys, which series comprises a plurality of white keys conforming to the requirements of claim 26,
  (b) means holding each key of said series against displacement during use,
  (c) a frame carrying said series and comprising an elongate member extending longitudinally of said assembly, and
  (d) a series of guide members depending from said longitudinal member and disposed for guiding down movement of rearward portions of the keys of said series during use.

35. A levelizer designed for use as a passenger levelizer when operatively supported by an underlying host white ivory and also as a carrier levelizer when concomitantly supporting a *tr* key operatively overlying it, which levelizer comprises
  (a) a frontward portion whose upper surface, in position of use, includes a first pair of top-most points lying in a first plane and whose lower surface includes a second pair of bottom-most points lying in a second plane, said planes being mutually parallel, the front and rear points of said first pair respectively directly overlying the front and rear points of said second pair a distance equal to approximately 7/16 inch, and the rear points of each said pair being at least one inch rearward of the front points of each said pair, as measured in said respective planes,
  (b) a rearward portion whose bottom surface is upwardly offset from said second plane, thereby making space available for placement of motionless-in-use structure subjacent to said rearward portion while also permitting descent of its said bottom surface during use, and
  (c) at least one frontwardly facing wall surface whereby frontward displacement of said levelizer may be prevented via positioning of anchor means in frontward juxtaposition to said wall surface.

36. The levelizer of claim 35 wherein
(d) downwardly extending walls depend from each side of said bottom surface of said rearward portion, thereby providing a sleeve subjacent thereto, with inward surfaces of said walls constituting the sides of said sleeve.

37. The *tr* assembly of claim 11 which comprises
(g) *tr* keys in accordance with claim 31 and
(h) levelizers in accordance with claim 40.

38. A piano type keyboard assembly comprising
(a) a plurality of *tr* keys having white ivories and a plurality of manual components underlying said ivories and disposed to descend in response to application of down force on said ivories during use,
(b) a longitudinal frame and a plurality of elongate motionless-in-use guide members held thereto and extending frontwardly therefrom to loci underlying said ivories,
(c) at least rearward portions of said manual components comprising elongate, frontwardly extending guide sleeves disposed to descend during use with their inner walls respectively flanking the side of said guide members,
(d) sidewise displacement of said manual components when descending in use being thereby prevented.

39. The assembly of claim 38 wherein
(e) said manual components are body portions of said *tr* keys and said *tr* keys are carried by said frame.

40. The assembly of claim 38 wherein
(f) said manual components are levelizers and are carried by said frame.

41. The assembly of claim 38 wherein
(g) said guide sleeves have ceiling portions disposed for being supportingly engaged by said guide members of lifting of said frame.

42. The assembly of claim 41 wherein
(h) said manual components are levelizers and said sleeves and said ceiling portions are comprised in said levelizers.

43. The assembly of claim 41 wherein
(i) said manual components are body portions of said *tr* keys which underlie the ivories of said keys, and said sleeves and said ceiling portions are comprised in said body portions.

44. In a *tr* keyboard assembly comprising a first series of piano type *tr* keys and a second series of keys-levelizing members operatively associated with said first series,
(a) a pair of curtains and
(b) means for holding said curtains at loci respectively superjacent to treble-endward and bass-endward portions of said first series, to thereby enable said curtains to serve as visual barriers at each end of the active span of the *tr* keys of said first series, said loci being stationary during selected transpositional adjustments of said first series along said second series.

45. The assembly of claim 44 wherein
(c) said means permits an upward component of motion of at least a lower portion of each said curtain when held by said means as aforesaid, in response to transpositional shifting of said first series along said second series.

46. The assembly of claim 45 wherein
(d) said portion is flexible, thereby permitting said upward component of motion to occur via flexing of said portion.

47. The assembly of claim 45 which comprises
(e) a non-shiftable frame on which said curtains are mounted in manner aforesaid,
(f) said curtains being gates disposed to rise in response to said shifting.

48. In a piano type *tr* assembly
(a) a white *tr* key, and
(b) a key-levelizing member,
(c) said key and said member being disposed to descend in passenger-carrier manner, in response to down pressure applied anywhere in a first area of the ivory of said key, said area being at least 1 inch in front-rear dimension and located rearwardly of the front of said key-levelizing member,
(d) a fulcrum overlying a rearward portion of said key,
(e) said ivory comprising a second area disposed frontwardly of the front end of said key-levelizing member, and
(f) said key being disposed to swing downwardly about said fulcrum as a pivot, in response to down pressure applied anywhere on said second area.

49. An assembly according to claim 48 which comprises
(g) an additional fulcrum overlying a frontward portion of said key, and wherein
(h) said ivory comprises a third area disposed rearwardly of said first area,
(i) said key being disposed to swing downwardly about said additional fulcrum as a pivot, in response to down pressure applied anywhere on said third area.

50. A transposing device for a keyboard musical instrument comprising
(a) a first frame and a series of keys-levelizing members held adjacent thereto,
(b) a second frame and a chromatic series of piano type *tr* keys held thereto and transpositionally shiftable as a unit along said first frame,
(c) said second frame comprising a longitudinal member having a front surface which is beveled downwardly-rearwardly, thereby facilitating lifting of said second frame by application of upward finger force against said surface.

51. A *tr* assembly comprising a chromatic series of piano type keys and a plurality of levelizers operatively associated therewith, wherein
(a) the bottoms of said *tr* keys comprise a first series of upward recesses and the bottoms of said levelizers comprise a second series of upward recesses plus apertures extending therefrom to the tops of said levelizers,
(b) said assembly also comprising an elongate motionless-in-use frame member extending transversely through said first series of recesses and carrying guide members extending downwardly through said apertures,
(c) said assembly further comprising motionless-in-use cagers adjacent the lower ends of said guide members,
(d) whereby said first series of recesses perimts descent of said keys without impingement on said frame member and said second series of recesses permits descent of said levelizers along said guide members without impingement on said cagers; said heads respectively serving as supports for said levelizers during installation of said assembly into position of use and de-installation therefrom.

52. In a piano type *tr* assembly
(a) a first frame and a first chromatic series of keys-levelizing members held thereto, upper frontward surfaces of said members lying in a common elevation,
(b) an elongate box carrying a second chromatic series of *tr* keys in operative association with said first series and respectively resting thereon at said common elevation,
(c) each end of said box comprising a transverse aperture having a rear wall and a front wall,
(d) said first frame comprising end blocks which are hollow, have rear walls and front walls, and floors lying in said common elevation, endward portions of said box being respectively housed in said end blocks at all times during use and being slidable rightwardly and leftwardly therein to accomplish transpositional shifting of said second series in relation to said first series, (e) each key of said second series comprising a transverse aperture having a rear wall and a front wall, (f) frontward surfaces of said rear walls of each said aperture lying in a first upwardly extending plane, and rearward surfaces of said front walls of each said aperture lying in a second upwardly extending plane, (g) a longitudinal member extending through each aforesaid aperture with its front and rear surfaces in respective juxtaposition to said second and first upwardly extending planes, (h) front-rear displacement of said box being prevented by said walls of at least one said end block, front-rear displacement of said longitudinal member being prevented by said walls of said apertures in said each end of said box, and front-rear displacement of said keys being prevented by said front and rear surfaces of said longitudinal member.

53. The key of claim 27 wherein
(i) said bottom surface makes a downward angle at a locus which is rearward of said vertical plane and frontward of said another upward angle.

References Cited by the Examiner
UNITED STATES PATENTS

| | | | |
|---|---|---|---|
| 23,956 | 3/55 | Jewett | 84—446 X |
| 540,288 | 6/95 | Witherel | 84—466 |
| 904,730 | 11/08 | Scurfield | 84—446 |
| 1,004,350 | 9/11 | Bialik | 84—446 |
| 1,107,783 | 8/14 | Goss | 84—446 |
| 1,392,883 | 10/21 | Tow | 84—446 |
| 2,996,942 | 8/61 | Jewett | 84—446 |

LEO SMILOW, *Primary Examiner.*